(12) United States Patent
Seto et al.

(10) Patent No.: US 6,395,659 B2
(45) Date of Patent: May 28, 2002

(54) ULTRAVIOLET/INFRARED ABSORBENT GLASS

(75) Inventors: Hiromitsu Seto; Koichi Sakaguchi; Shigeki Nakagaki, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/875,175

(22) Filed: Jun. 7, 2001

Related U.S. Application Data

(63) Continuation-in-part of application No. 09/409,381, filed on Sep. 30, 1999, now abandoned.

(30) Foreign Application Priority Data

Nov. 9, 1998 (JP) ............................................. 10-317355

(51) Int. Cl.[7] .............................................. C03C 3/087
(52) U.S. Cl. ............................. 501/64; 501/65; 501/66; 501/71
(58) Field of Search ............................. 501/64, 65, 66, 501/70, 71, 72

(56) References Cited

U.S. PATENT DOCUMENTS

| 5,264,400 | A | * | 11/1993 | Nakaguchi et al. | ............ | 501/71 |
|---|---|---|---|---|---|---|
| 5,318,931 | A | * | 6/1994 | Nakaguchi et al. | ............ | 501/64 |
| 5,344,798 | A | * | 9/1994 | Morimoto et al. | ............ | 501/70 |
| 5,837,629 | A | * | 11/1998 | Combes et al. | ............... | 501/70 |

FOREIGN PATENT DOCUMENTS

| EP | 561 337 A | * | 9/1993 |
|---|---|---|---|
| EP | 565 882 A | * | 10/1993 |
| EP | 834 481 A | * | 4/1998 |
| JP | 06-092678 A | * | 4/1994 |
| JP | 06-345482 A | * | 12/1994 |
| JP | 06-345483 A | * | 12/1994 |
| JP | 799 805 A | * | 10/1997 |
| JP | 09-286632 A | * | 11/1997 |
| JP | 10-072239 A | * | 3/1998 |
| WO | WO-99/01392 A | * | 1/1999 |

* cited by examiner

*Primary Examiner*—David Sample
(74) *Attorney, Agent, or Firm*—Kanesaka & Takeuchi

(57) ABSTRACT

The ultraviolet/infrared transmittance glass consists of base glass including: 65 to 80 wt. % $SiO_2$; 0 to 5 wt. % $B_2O_3$; 0 to 5 wt. % $Al_2O_3$; 0 to 10 wt. % MgO; 5 to 15 wt. % CaO; 10 to 18 wt. % $Na_2O$; 0 to 5 wt. % $K_2O$; 5 to 15 wt. % total amount of MgO and CaO; and 0 to 20 wt. % total amount of $Na_2O$ and $K_2O$, colorants including: equal to or more than 0.05 wt. % and less than 0.2 wt. % total iron oxide (T—$Fe_2O_3$) expressed as $Fe_2O_3$; 0.63 to 1.4 wt. % $CeO_2$; 0.02 to 1.5 wt. % $TiO_2$; 0.0005 to 0.005 wt. % CoO; and 0.0003 to 0.002 wt. % Se. FeO expressed as $Fe_2O_3$ is between 30 wt. % and 60 wt. % of T—$Fe_2O_3$.

12 Claims, No Drawings

ULTRAVIOLET/INFRARED ABSORBENT GLASS

CROSS REFERENCE TO RELATED APPLICATION

This is a continuation-in-part application of patent application Ser. No. 09/409,381 filed on Sep. 30, 1999 now abandoned.

FIELD OF THE INVENTION

The present invention relates to an ultraviolet/infrared absorbent glass having a bronze or gray color shade.

BACKGROUND OF THE INVENTION AND RELATED ART STATEMENT

Recently, a variety of glasses with ultraviolet/infrared absorptivity to be used as a vehicle window glass including a windshield have been proposed with a view of preventing degradation of luxurious interior materials and reducing cooling load of the vehicle.

For example, glasses having a green color shade and being improved in the infrared absorptivity and the ultraviolet absorptivity due to including a relatively large amount of $Fe_2O_3$ have been developed as a window glass of a vehicle.

A glass having a bronze, brown or gray color shade includes a smaller amount of $Fe_2O_3$ than that of the glass having a green color shade and employs ultraviolet absorbing agents including $CeO_2$, $TiO_2$ and $V_2O_5$ so as to be provided with the ultraviolet absorptivity. For example, a heat rays absorbent glass having a bronze color shade disclosed in Japanese Patent Publication H6-40741A consists of a base glass including 68 to 74 wt. % $SiO_2$, 0.1 to 3.0 wt. % $Al_2O_3$, 2 to 4.5 wt. % MgO, 8 to 11 wt. % CaO, 11.5 to 16 wt. % $Na_2O$, 0.5 to 3.0 wt. % $K_2O$, 0.1 to 0.4 wt. % $SO_3$, 68 to 74 wt. % total amount of $SiO_2$ and $Al_2O_3$, 11 to 15 wt. % total amount of CaO and MgO and 12 to 17 wt. % total amount of $Na_2O$ and $K_2O$, and colorants including 0.13 to 0.55 wt. % total iron oxide (T—$Fe_2O_3$) expressed as $Fe_2O_3$, 0.2 to 0.6 wt. % $CeO_2$, 0.15 to 0.45 wt. % $TiO_2$, 0.3 to 14 ppm CoO and 5 to 20 ppm Se, in which the reduction rate of the glass ($Fe^{2+}/Fe^{3+}$) is between 17% and 55%.

A colored ultraviolet absorbent glass disclosed in Japanese Patent Publication H6-345482A is a glass having a brown color shade consisting of 65 to 75 wt. % $SiO_2$, 0.1 to 5 wt. % $Al_2O_3$, 1 to 6 wt. % MgO, 5 to 15 wt. % CaO, 10 to 18 wt. % $Na_2O$, 0 to 5 wt. % $K_2O$, 0.05 to 1.0 wt. % $SO_3$, 0.2 to 1.5 wt. % $CeO_2$, 0 to 1.0 wt. % $TiO_2$, 0 to 0.0015 wt. % CoO, 0.0002 to 0.0012 wt. % Se and 0.2 to 0.4 wt. % $Fe_2O_3$, in which $Fe^{2+}$ is in a range of 3 to 15 wt. % among the total amount of Fe.

A colored ultraviolet absorbent glass disclosed in Japanese Patent Publication H6-345483A consists of 65 to 75 wt. % $SiO_2$, 0.1 to 5 wt. % $Al_2O_3$, 1 to 6 wt. % MgO, 5 to 15 wt. % CaO, 10 to 18 wt. % $Na_2O$, 0 to 5 wt. % $K_2O$, 0.05 to 1.0 wt. % $SO_3$, 0.4 to 1.0 wt. % $CeO_2$, 0 to 1.0 wt. % $TiO_2$, 0.0018 to 0.0030 wt. % CoO, 0.0001 to 0.0010 wt. % Se and 0.1 to 0.3 wt. % $Fe_2O_3$, in which $Fe^{2+}$ is in a range of 3 to 20 wt. % among the total amount of Fe.

A gray glass composition disclosed in Japanese Patent Publication H8-48540A consists of 66 to 75 wt. % $SiO_2$, 0 to 5 wt. % $Al_2O_3$, 0 to 5 wt. % MgO, 5 to 15 wt. % CaO, 10 to 20 wt. % $Na_2O$, 0 to 5 wt. % $K_2O$, 0.0003 to 0.0050 wt. % CoO, 0.0001 to 0.0015 wt. % Se, 0.30 to 0.70 wt. % $Fe_2O_3$ (total iron), not more than 0.21 wt. % FeO and less than 2.0 wt. % of $CeO_2$, $V_2O_5$, $TiO_2$ and $MoO_3$ to be provided with a dull gray color shade.

An ultraviolet/infrared absorbent glass disclosed in Japanese Patent Publication H6-92678A consists of 65 to 80 wt. % $SiO_2$, 0 to 5 wt. % $Al_2O_3$, 0 to 5 wt. % $B_2O_3$, 0 to 10 wt. % MgO, 5 to 15 wt. % CaO, 10 to 18 wt. % $Na_2O$, 0 to 5 wt. % $K_2O$, 5 to 15 wt. % total amount of MgO and CaO, 10 to 20 wt. % total amount of $Na_2O$ and $K_2O$, 0.3 to 2 wt. % cerium oxide expressed as $CeO_2$, 0 to 1 wt. % $TiO_2$, 0.1 to 0.8 wt. % T—$Fe_2O_3$, 0 to 0.006 wt. % CoO, 0 to 0.01 wt. % NiO and 0 to 0.0015 wt. % Se.

The conventional ultraviolet/infrared absorbent glasses as referred above are provided with the ultraviolet absorptivity due to a sole action and/or an interaction of one or more than two from among $Fe_2O_3$, $CeO_2$, $TiO_2$ and the like, and with the heat rays absorptivity due to FeO added in the form of $Fe_2O_3$ and reduced therefrom. However, it is difficult to provide a bronze or gray color shade developed due to Se and a high ultraviolet and infrared absorptivity for the same glass simultaneously.

For example, the glass having a bronze color shade disclosed in Japanese Patent Publication H6-40741A requires relatively large contents of $Fe_2O_3$ and $TiO_2$ in order to provide the ultraviolet absorptivity because of its relatively small content of $CeO_2$. In this case, the glass is reduced in the visible light transmittance and the shade is tinged with yellow to become tar tint. It is also difficult to maintain the pink color developed by Se and to provide the bronze or gray color shade in the sight of the present invention for the glass because Se is easy to develop dark brown when the glass includes a large amount of T—$Fe_2O_3$.

Each of the glasses having a bronze or gray color shade disclosed in Japanese Patent Publications H6-345482A, H6-345483A and H8-48540A has a disadvantage that indeed the glass has the ultraviolet absorptivity, but is reduced in the infrared absorptivity because the glasses include a small content of FeO in contrast with its large content of T—$Fe_2O_3$.

Examples 1 through 18 of the ultraviolet/infrared glass disclosed in Japanese Patent Publication H6-92678 include a small content of T—$Fe_2O_3$. These examples except for the example 13 are disadvantageously reduced in the infrared absorptivity and increased in the solar energy transmittance (TG). The example 13 is provided with TG of equal to or less than 65%, while the glass includes 1.46 wt. % $CeO_2$ in order to be balanced against the visible light transmittance and the ultraviolet transmittance thereof. $CeO_2$, is not preferable to be used in large amounts because of its expensive cost.

OBJECT AND SUMMARY OF THE INVENTION

It is an object of the present invention to solve conventional problems described above and provide an ultraviolet/infrared absorbent glass having a bronze or gray color shade which is provided with a high ultraviolet and infrared absorptivity.

The ultraviolet/infrared absorbent glass of the present invention consists of a base glass comprising:

65 to 80 wt. % $SiO_2$;
0 to 5 wt. % $B_2O_3$;
0 to 5 wt. % $Al_2O_3$;
0 to 10 wt. % MgO;
5 to 15 wt. % CaO;
10 to 18 wt. % $Na_2O$;
0 to 5 wt. % $K_2O$;
5 to 15 wt. % total amount of MgO and CaO; and
10 to 20 wt. % total amount of $Na_2O$ and $K_2O$, colorants including:
equal to or more than 0.05 wt. % and less than 0.2 wt. % total iron oxide (T—$Fe_2O_3$) expressed as $Fe_2O_3$;
0.63 to 1.4 wt. % $CeO_2$;
0.02 to 1.5 wt. % $TiO_2$;
0.0005 to 0.005 wt. % CoO; and
0.0003 to 0.002 wt. % Se.

In the glass of the present invention FeO expressed as $Fe_2O_3$ is between 30 wt. % and 60 wt. % of T—$Fe_2O_3$.

The ultraviolet/infrared absorbent glass may further comprise 0.001 to 0.01 wt. % NiO so as to adjust its color of the shade.

The ultraviolet/infrared absorbent glass is preferable to include 0.01 to 1 wt. % $La_2O_3$.

The ultraviolet/infrared absorbent glass at any thickness between 2.6 mm and 6.3 mm is preferable to be provided with the visible light transmittance of equal to or more than 65% when measured by using the CIE illuminant A, the solar energy transmittance of equal to or less than 65% when measured over a wavelength between 300 nm and 2100 nm and the ultraviolet transmittance specified by ISO of equal to or less than 20%.

The ultraviolet/infrared absorbent glass at any thickness between 2.6 mm and 6.3 mm is preferable to be provided with the excitation purity of equal to or less than 10% when measured by using the CIE illuminant C and a bronze color shade having the chromaticity expressed as a* and b* defined by the L*a*b* coordinates in ranges of $-2 \leq a^* \leq 1$ and $4 \leq b^* \leq 10$.

The ultraviolet/infrared absorbent glass at any thickness between 2.6 mm and 6.3 mm is preferable to be provided with the excitation purity of equal to or less than 5% when measured by using the CIE illuminant C and a gray color shade having the chromaticity expressed as a* and b* defined by the L*a*b* coordinates in ranges of $-2 \leq a^* \leq 1$ and $-1 \leq b^* \leq 4$.

DETAILED DESCRIPTION OF PREFERRED EMBODIMENTS

The description will be made as regard to the ultraviolet/infrared absorbent glass composition of the present invention. It should be noted that components will be represented with percentage by weight. The composition is based on that of a glass which is suitable for being molded in the floating process.

$SiO_2$ (silica) is a principal component for forming skeleton of glass. Less than 65% $SiO_2$ lowers the durability of the glass and more than 80% $SiO_2$ raises the melting temperature of the glass so high.

$B_2O_3$ is a component for improving the durability of the glass, prompting to melt, and yet enhancing the ultraviolet absorption. $B_2O_3$ should be less than 5%, since reduction of the transmittance in the ultraviolet range extends even to the visible range to tinge the glass with yellow and difficulties during forming are caused due to the vaporization of $B_2O_3$ when $B_2O_3$ exceeds 5%.

$Al_2O_3$ is a component for improving the durability of the glass. More than 5% $Al_2O_3$ raises the melting temperature of the glass so high. $Al_2O_3$ is preferable to be included equal to or less than 5%, particularly in a range of 0.1 to 2%.

MgO and CaO improve the durability of the glass and adjust a liquidus temperature and viscosity of the glass during molding. More than 10% MgO raises the liquidus temperature. Less than 5% or more than 15% CaO raises the liquidus temperature of the glass. The durability of the glass is lowered when the total amount of MgO and CaO is less than 5%, while the liquidus temperature is increased when the total exceeds 15%.

$Na_2O$ and $K_2O$ prompt the glass to melt. The efficiency of promotion of melting becomes poor when $Na_2O$ is less than 10% or the total of $Na_2O$ and $K_2O$ is less than 10%, while the durability of the glass is lowered when $Na_2O$ exceeds 18% or the total of $Na_2O$ and $K_2O$ exceeds 20%. $K_2O$ also prompts Se to develop its pink color and improve the ultraviolet absorptivity at the same time. $K_2O$ is preferable not to exceed 5% because $K_2O$ is expensive as compared to $Na_2O$.

Iron oxide is present in the form of $Fe_2O_3$ ($Fe^{3+}$) and the form of FeO ($Fe^{2+}$) in the glass. $Fe_2O_3$ is a component for improving the ultraviolet absorptivity and FeO is a component for improving the heat rays absorptivity just as $CeO_2$ and $TiO_2$.

When the amount of T—$Fe_2O_3$ is too small, the glass is reduced in the infrared absorptivity and ultraviolet absorptivity, while, when the content of T—$Fe_2O_3$ is too large, the glass is reduced in the visible light transmittance and it is difficult to obtain the desired shade because the color development of Se becomes to be tinged with dark brown. Therefore, T—$Fe_2O_3$ is preferable to be contained in an amount of equal to or more than 0.05% and less than 0.2%.

When the amount of FeO is too small, the glass is reduced in the infrared absorptivity, while, when the content of FeO is too large, the glass is reduced in the visible light transmittance. Therefore, a ratio of FeO expressed as $Fe_2O_3$ to T—$Fe_2O_3$ is preferable to be in a range of 30 to 60%.

The present invention aims to improve the infrared absorption of the glass while maintaining the visible light transmittance thereof at a high degree depending on a large content of FeO in contrast with a small content of T—$Fe_2O_3$. Therefore, the glass of the present invention includes T—$Fe_2O_3$ and FeO in ranges applying to this aim.

$CeO_2$ is an essential component of the present invention for improving the ultraviolet absorptivity and is present in the form of $Ce^{3+}$ or in the form of $Ce^{4+}$ in the glass. Particularly, $Ce^{3+}$ is effective in absorbing ultraviolet with less absorptivity in the visible range. When $CeO_2$ is contained too much, the visible rays having a short wavelength are excessively absorbed to tinge the glass with yellow. Since the cerium oxide which is the raw material of $CeO_2$ is expensive and acts as an oxidizing agent, it is difficult to maintain the ratio of FeO to T—$Fe_2O_3$ at a high rate when the glass including a large amount of $CeO_2$. Therefore, the content of $CeO_2$ is between 0.63% and 1.4%.

$TiO_2$ is a component for improving the ultraviolet absorptivity particularly by interaction with FeO. Too much $TiO_2$ tinges the glass with yellow. $TiO_2$ is preferable to be included in a range of 0.02 to 1.5%.

CoO is a component for forming a bronze or gray color shade by cooperating with Se. Less than 0.0005% CoO can not form a desired color shade, while more than 0.005% CoO reduces the visible light transmittance.

Se contributes a pink color, so that it forms the bronze or gray color shade with the aid of a complementary color of CoO. Less than 0.0003% Se can not form a desired color shade, while more than 0.002% Se reduces the visible light transmittance.

$SO_3$ is supplied into the glass from the sulfate or the like which prompts the glass to be refined. The bronze or gray color shade can not be obtained because the color development of Se is weakened when $SO_3$ is more than 0.30%.

Although NiO brings the bronze or gray color shade, the content of NiO is not more than 0.01% because the glass is reduced in the visible light transmittance when NiO is contained too much.

$La_2O_3$ decreases viscosity of the molten glass, prompts the glass to be melted and improves the chemical durability including water-resistance of the glass. When $La_2O_3$ is added into a glass including $Fe_2O_3$ and $CeO_2$, $La_2O_3$ also reduces the ultraviolet transmittance. The content of $La_2O_3$ is preferable to be not more than 1% because of its expensive cost. Although $La_2O_3$ may added in the form of a raw material including $La_2O_3$ at a high rate, such a raw material requires to be refined and increases the cost. In order to save costs of raw materials, $La_2O_3$ is preferable to be added in the form of a mixture with $CeO_2$ yielded together with $La_2O_3$. $La_2O_3$ may be added also in the form of an impurity left in $CeO_2$ refined at a low degree. In this case, traces of oxidized rare earth elements including $Pr_2O_3$, $Nd_2O_3$ and the like may be added into the glass, but the glass may comprise them in such a range as not to lose effects of the present invention.

One or more than two among ZnO, MnO, $V_2O_5$, $MoO_3$, SnO may be added within a rang from 0 to 1% in total or within such a range as not to lose effects of the present invention.

ZnO can prevent from forming the nickel sulfide which is easy to appear during melting the glass in a reducing atmosphere and contributes explosion of the glass itself.

Each of MnO, $V_2O_5$ and $MoO_3$ acts as a component for absorbing the ultraviolet and for fine adjustment of the bronze or gray color shade depending on its degree of ultraviolet absorptivity in the glass. While, SnO acts as a reducing agent or a refining agent.

Hereinafter, the present invention will be described referring to examples.

Glass raw material comprising silica sand, dolomite, limestone, soda ash, potassium carbonate, boron oxide, ferric oxide, titanium oxide, cerium oxide, cobalt oxide, metallic selenium, nickel oxide, lanthanum oxide and the carbonaceous reducing agent (graphite etc.) are mixed in such a manner to obtain a desired composition. Then, the raw material is heated and melted in an electric furnace at 1500° C. After 4 hours' melting, the molten glass is flowed onto a stainless plate and annealed to the room temperature to obtain glass plates having a thickness of about 7 mm. Each of the glass plates is polished in order to reduce the thickness thereof to 3.5 mm, 4 mm or 5 mm to become a sample. After that, the sample is measured in the optical properties including the visible light transmittance (YA) measured by using the CIE illuminant A, the solar energy transmittance (TG), the ultraviolet transmittance (Tuv) specified by ISO, L*, a* and b* specified by CIE and measured by using the CIE illuminant C, the dominant wavelength (λd), and the excitation purity (Pe).

Compositions and optical properties of each Example are shown in Table 1. The compositions are represented with percent or ppm by weight and the ratio of FeO expressed as $Fe_2O_3$ to T—$Fe_2O_3$ is also represented with weight percent.

TABLE 1

| | Example | 1 | 2 | 3 | 4 | 5 |
|---|---|---|---|---|---|---|
| glass compo- sition [wt. %] | $SiO_2$ | 70.6 | 70.6 | 70.6 | 71.1 | 71.1 |
| | $Al_2O_3$ | 1.6 | 1.6 | 1.6 | 1.6 | 1.6 |
| | MgO | 3.3 | 3.3 | 3.3 | 3.3 | 3.3 |
| | CaO | 8.5 | 8.5 | 8.6 | 8.6 | 8.6 |
| | $Na_2O$ | 13.5 | 13.5 | 13.7 | 13.7 | 13.7 |
| | $K_2O$ | 0.8 | 0.8 | 0.8 | 0.8 | 0.8 |
| | T-$Fe_2O_3$ | 0.19 | 0.15 | 0.19 | 0.18 | 0.18 |
| | FeO | 0.079 | 0.071 | 0.081 | 0.080 | 0.056 |
| | FeO/T-$Fe_2O_3$ (%) | 41.6 | 47.3 | 42.6 | 44.4 | 31.1 |
| | $CeO_2$ | 0.65 | 0.65 | 0.65 | 0.65 | 0.65 |
| | $TiO_2$ | 0.90 | 0.90 | 0.55 | 0.10 | 0.03 |
| | Se (ppm) | 10 | 12 | 14 | 12 | 10 |
| | CoO (ppm) | 25 | 30 | 50 | 31 | 25 |
| | NiO (ppm) | | | | | 50 |
| opti- cal prop- erty | thickness of the glass (mm) | 3.5 | 3.5 | 3.5 | 3.5 | 4.9 |
| | YA (%) | 71.8 | 71.7 | 66.7 | 72.7 | 68.7 |
| | TG (%) | 61.1 | 62.0 | 60.9 | 61.1 | 61.9 |
| | Tuv (%) | 14.8 | 17.5 | 17.6 | 20.0 | 15.4 |
| | L* | 87.24 | 87.24 | 84.82 | 88.06 | 85.39 |
| | a* | −1.19 | −1.00 | −0.51 | 0.07 | 0.14 |
| | b* | 4.52 | 3.28 | 1.16 | 3.45 | 6.86 |
| | λd (nm) | 573.0 | 572.5 | 570.3 | 577.6 | 577.7 |
| | Pe (%) | 4.55 | 3.27 | 1.15 | 3.64 | 7.45 |

Table 1 shows that Examples 1 through 5 are within the scope of the first aspect. Every glass of the Examples consists of:

equal to or more than 0.05 wt. % and less than 0.2 wt. % total iron oxide (T—$Fe_2O_3$) expressed as $Fe_2O_3$;

0.63 to 1.4 wt. % $CeO_2$;

0.02 to 1.5 wt. % $TiO_2$;

0.0005 to 0.005 wt. % CoO; and 0.0003 to 0.002 wt. % Se, wherein FeO expressed as $Fe_2O_3$ is between 30% and 60% of T—$Fe_2O_3$.

Every glass of the Examples is also in the scope of the second aspect and has the high visible light transmittance and the superior ultraviolet and infrared absorptivity.

Among the Examples, the glasses of Examples 1, 5 are provided with the bronze color shade having the excitation purity of 10% or less when measured by using the CIE illuminant C and the chromaticity expressed as a* and b* by using the CIE color coordinates in ranges of −2≦a*≦1 and 4≦b*≦10.

The glasses of Examples 2, 3, 4 are provided with the gray color shade having the excitation purity of 5% or less when measured by using the CIE illuminant C and the chromaticity expressed as a* and b* by using the CIE color coordinates in ranges of $-2 \leq a^* \leq 1$ and $-1 \leq b^* \leq 4$.

Example 5 employs NiO as a component for controlling the color of the shade.

In Table 2, characteristics of Comparative Examples of the present invention are shown.

TABLE 2

| | Comparative Example | 1 | 2 | 3 |
|---|---|---|---|---|
| glass composition [wt. %] | $SiO_2$ | 72.00 | 71.0 | 71.0 |
| | $B_2O_3$ | 0.00 | 0.0 | 0.0 |
| | $Al_2O_3$ | 1.72 | 1.6 | 1.6 |
| | MgO | 3.88 | 3.3 | 3.3 |
| | CaO | 7.60 | 8.6 | 8.6 |
| | $Na_2O$ | 12.80 | 13.7 | 13.7 |
| | $K_2O$ | 0.68 | 0.8 | 0.8 |
| | $T-Fe_2O_3$ | 0.25 | 0.45 | 0.29 |
| | FeO | 0.019 | 0.038 | 0.160 |
| | $FeO/T-Fe_2O_3$ (%) | 7.5 | 9.4 | 61.3 |
| | Se (ppm) | 5 | 11 | 12 |
| | CoO (ppm) | 15 | 20 | 12 |
| | $CeO_2$ | 0.80 | 1.70 | 0.65 |
| | $TiO_2$ | 0.40 | 0.12 | 0.03 |
| optical property | thickness of the glass (mm) | 5.0 | 3.5 | 5.0 |
| | YA (%) | 74.5 | 73.5 | 61.8 |
| | TG (%) | 70.9 | 69.2 | 45.2 |
| | L* | 84.30 | 88.26 | 80.72 |
| | a* | −0.93 | 0.12 | −1.55 |
| | b* | 4.01 | 6.77 | 4.96 |
| | λd | 578.3 | 577.6 | 573.1 |
| | Pe (%) | 5.01 | 7.10 | 6.81 |
| | Tuv (ISO) (%) | 11.1 | 9.7 | 17.7 |

Comparative Example 1 consists of the same composition as Japanese Patent Publication H6-345482A as referred above. Comparative Example 1 has the low ratio of FeO to $T-Fe_2O_3$, the value of which is out of the scope of the present invention and the solar energy transmittance of more than 65%. Comparative Example 2 has $T-Fe_2O_3$, $CeO_2$ and the ratio of FeO to $T-Fe_2O_3$, every value of which is out of the scope of the present invention and also the solar energy transmittance of more than 65%. Comparative Example 3 has the high ratio of FeO to $T-Fe_2O_3$, the value of which is out of the scope of the present invention and the visible light transmittance of less than 65%. Any glasses of the Comparative examples can not combine the bronze or gray color shade, the high visible light transmittance, the low solar energy transmittance and the low ultraviolet transmittance simultaneously.

Aforementioned Examples and Comparative Examples show that the glass of the present invention is obviously a superior ultraviolet and infrared absorbent glass combining the bronze or gray color shade, the low ultraviolet transmittance and the low solar energy transmittance simultaneously.

As detailed above, according to the present invention, an ultraviolet/infrared absorbent glass combining the bronze or gray color shade, the low ultraviolet transmittance and the low solar energy transmittance can be provided due to color development of Se and CoO in parallel and also due to containing $T-Fe_2O_3$ in the content of more than 0.05 wt. % and less than 0.2 wt. % and FeO of 30 to 60 wt. % of $T-Fe_2O_3$ so as to improve the infrared absorptivity while maintaining the visible light transmittance at a high rate, $CeO_2$ of 0.63 to 1.4 wt. % to perform the melting process in a reducing atmosphere, $TiO_2$ of 0.02 to 1.5 wt. % to compensate for the ultraviolet absorptivity.

The ultraviolet/infrared absorbent glass of the present invention is excellent in preventing degradation and discoloration of interior materials when the glass is used for a window glass of a vehicle, a building or the like.

What is claimed is:

1. An ultraviolet/infrared absorbent glass consisting of base glass and colorants, said base glass comprising:
   65 to 80 wt. % $SiO_2$;
   0 to 5 wt. % $B_2O_3$;
   0 to 5 wt. % $Al_2O_3$;
   0 to 10 wt. % MgO;
   5 to 15 wt. % CaO;
   10 to 18 wt. % $Na_2O$;
   0 to 5 wt. % $K_2O$;
   5 to 15 wt. % total amount of MgO and CaO; and
   10 to 20 wt. % total amount of $Na_2O$ and $K_2O$, said colorants comprising:
   equal to or more than 0.05 wt. % and less than 0.19 wt. % total iron oxide ($T-Fe_2O_3$) expressed as $Fe_2O_3$;
   0.63 to 1.4 wt. % $CeO_2$;
   0.02 to 1.5 wt. % $TiO_2$;
   0.0005 to 0.005 wt. % CoO; and
   0.0003 to 0.002 wt. % Se,
   FeO expressed as $Fe_2O_3$ being between 31.1 wt. % and 60 wt. % of $T-Fe_2O_3$.

2. An ultraviolet/infrared absorbent glass as claimed in claim 1, wherein the glass at any thickness in a range of 2.6 to 6.3 mm has a visible light transmittance of equal to or more than 65% when measured by using CIE illuminant A, a solar energy transmittance of equal to or less than 65%, and an ultraviolet transmittance specified by ISO of equal to or less than 20%.

3. An ultraviolet/infrared absorbent glass as claimed in claim 1, wherein the glass at any thickness in a range of 2.6 to 6.3 mm has a bronze color shade having an excitation purity of equal to or less than 10% when measured by using CIE illuminant C, and a chromaticity expressed as a* and b* by using L*a*b* coordinates in ranges of $-2 \leq a^* \leq 1$ and $4 \leq b^* \leq 10$.

4. An ultraviolet/infrared absorbent glass as claimed in claim 1, wherein the glass at any thickness in a range of 2.6 to 6.3 mm has a gray color shade having an excitation purity of equal to or less than 5% when measured by using CIE illuminant C, and a chromaticity expressed as a* and b* by using L*a*b* coordinates in ranges of $-2 \leq a^* \leq 1$ and $-1 \leq b^* \leq 4$.

5. An ultraviolet/infrared absorbent glass as claimed in claim 1, wherein the glass further comprises NiO in a range of 0.001 to 0.01 wt. %.

6. An ultraviolet/infrared absorbent glass as claimed in claim 1, wherein the glass further comprises $La_2O_3$ in a range of 0.01 to 1 wt. %.

7. An ultraviolet/infrared absorbent glass as claimed in claim 1, wherein the glass comprises $Al_2O_3$ in a range of 0.1 to 2 wt. %.

8. An ultraviolet/infrared absorbent glass as claimed in claim 1, wherein the glass further comprises at least one selected from a group consisting of ZnO, MnO, $V_2O_5$, $MoO_3$ and SnO in a range of 0 to 1 wt. %.

9. An ultraviolet/infrared absorbent glass as claimed in claim 1, wherein said total iron oxide (T—$Fe_2O_3$) expressed as $Fe_2O_3$, is less than 0.18 wt %.

10. An ultraviolet/infrared absorbent glass as claimed in claim 1, wherein said total iron oxide (T—$Fe_2O_3$) expressed as $Fe_2O_3$, is less than 0.15 wt %.

11. An ultraviolet/infrared absorbent glass as claimed in claim 1, wherein said FeO expressed as $Fe_2O_3$ is between 41 wt. % and 60 wt. % of T—$Fe_2O_3$.

12. An ultraviolet/infrared absorbent glass as claimed in claim 1, wherein said base glass consists essentially of said $SiO_2$, $B_2O_3$, $Al_2O_3$, MgO, CaO, $Na_2O$ and $K_2O$; and said colorants consist essentially of said total iron oxide (T—$Fe_2O_3$) expressed as $Fe_2O_3$, $CeO_2$, $TiO_2$, CoO and Se.

* * * * *